3,029,379
SALINITY INDICATING SYSTEM WITH AUTOMATIC TEMPERATURE COMPENSATION INCLUDING ALARM
Maxwell Ingram, Dumont, N.J., assignor to McNab, Incorporated, New York, N.Y., a corporation of New York
Filed Sept. 30, 1958, Ser. No. 764,423
14 Claims. (Cl. 324—30)

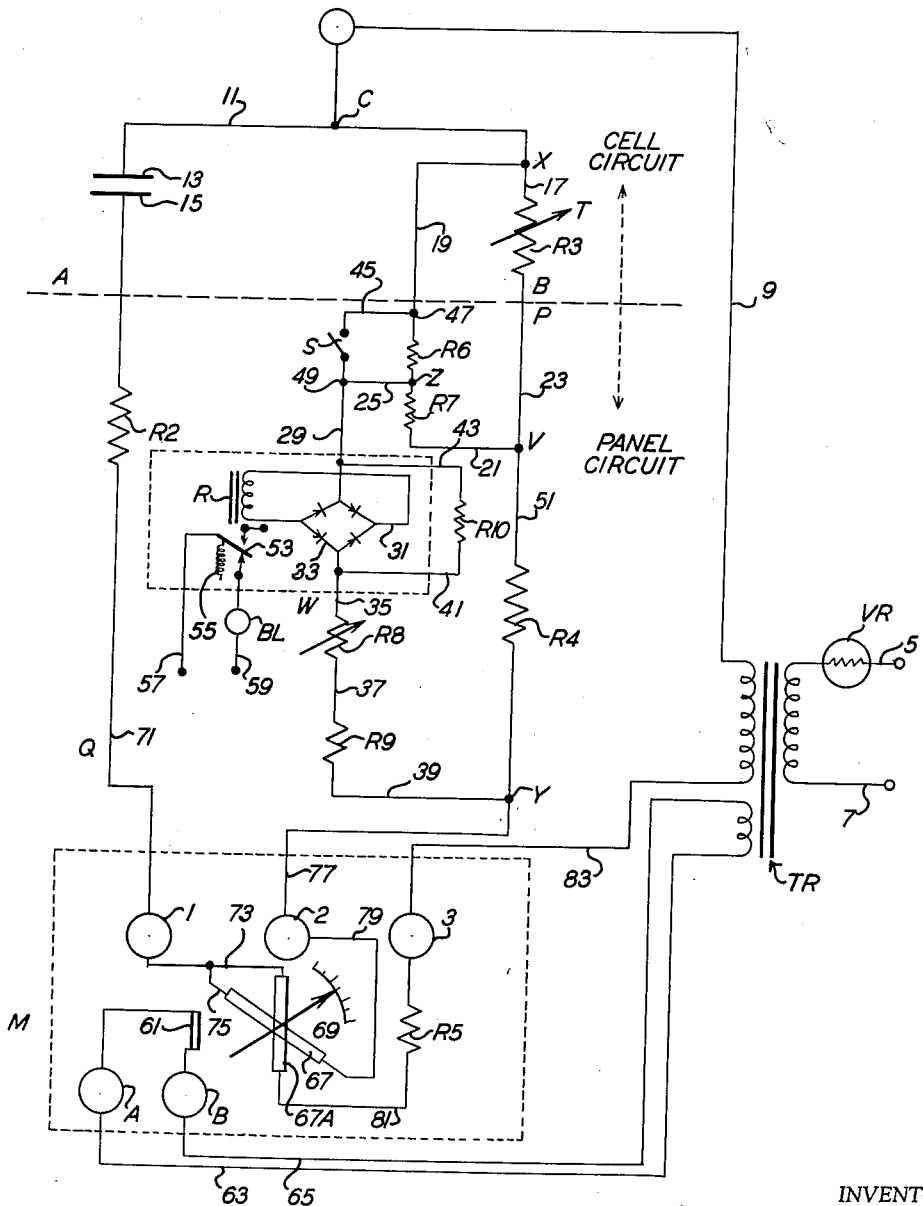

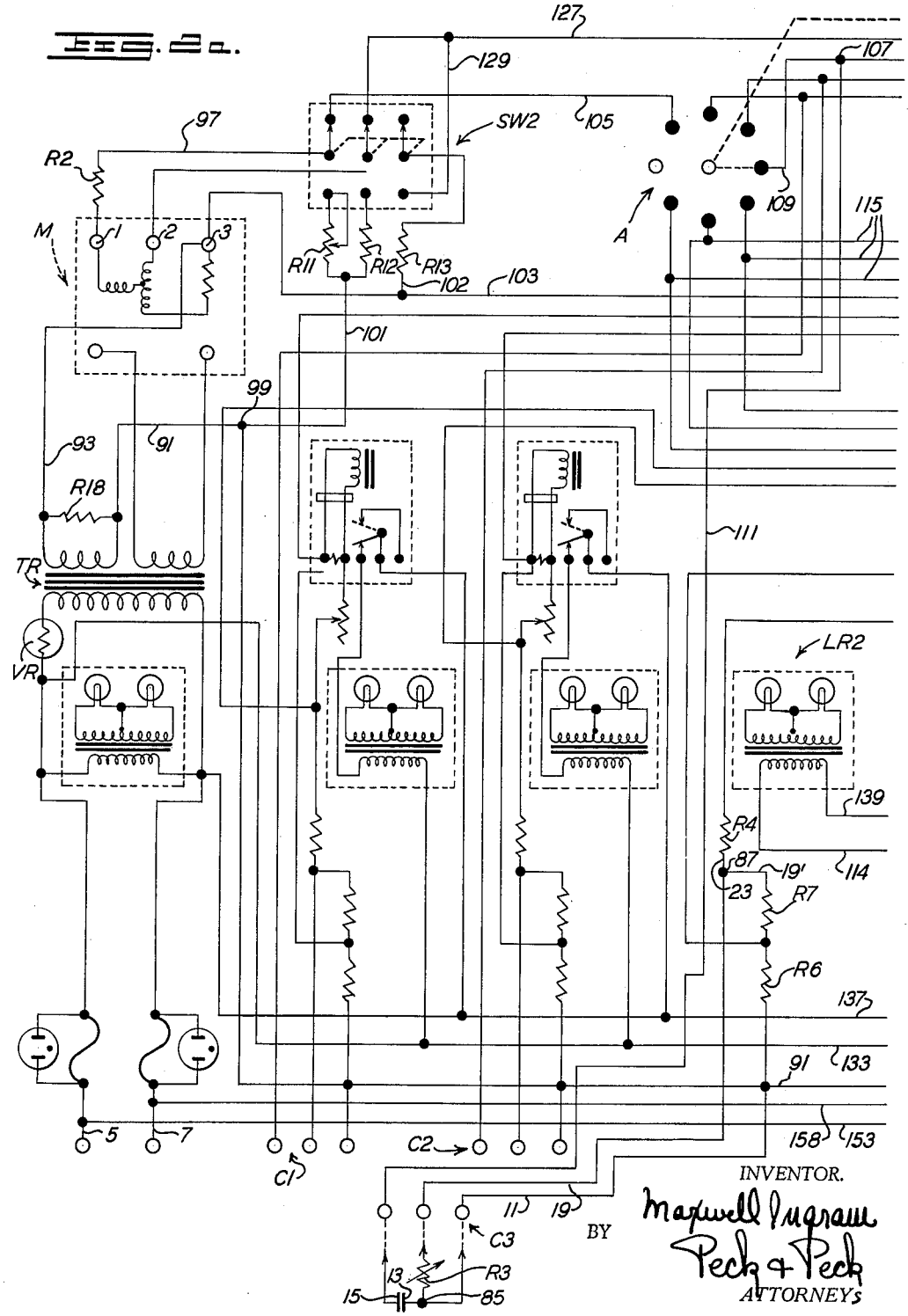

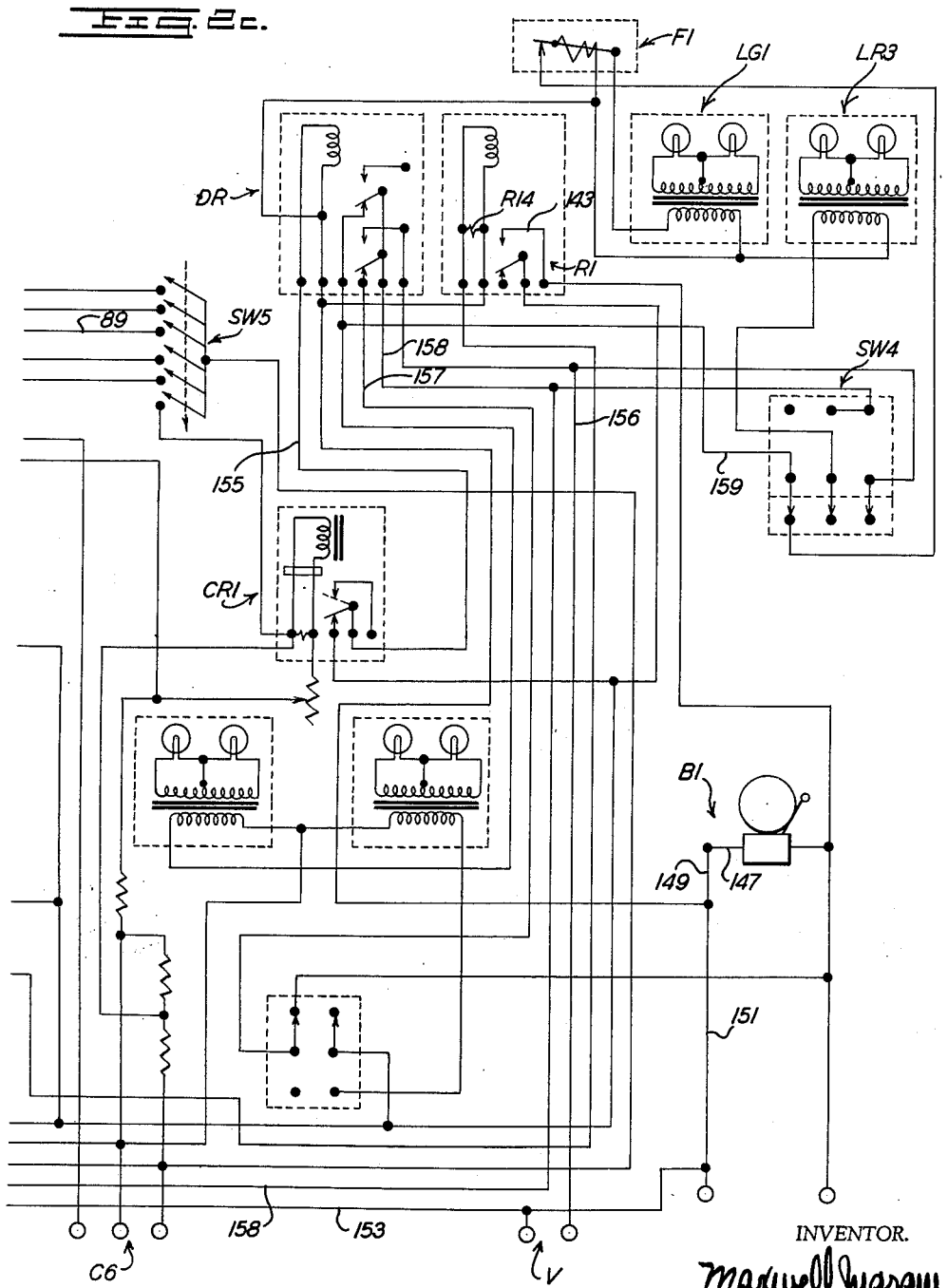

This invention relates broadly to systems for energizing an alarm mechanism when the salinity of a liquid reaches a predetermined value and in its more specific aspects it relates to such a system whose accuracy is unaffected by temperature variations of the liquid under test and when incorporated with a meter system does not affect the accuracy of the meter reading; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

Salinity indicators and alarm systems stand guard, night and day, year in and year out, over distillation plants to prevent saline water from entering boiler tubes in steam engines. The alarm must be actuated instantly the saline content reaches a predetermined value and the system operated to dump undesirable water when this maximum value of salinity or chloride solids has been exceeded.

One of the major objects of my invention is to provide an alarm system which is accurate and reliable in operation under continuous use.

A further object of my invention is to successfully incorporate an alarm system with a salinity indicating system which will alarm at values substantially as accurate as the meter readings under repeat conditions.

A further primary purpose is to combine the aforementioned systems into a unitary system wherein the alarm will be actuated at a fixed salinity setting, independently of changes in liquid temperature within a temperature range of 40° to 250° F.

The inherent character of water is such that the electrical conductivity thereof increases with higher temperatures, which when plotted forms a logarithmic curve, conversely, decreases in conductivity, or increases in resistance with a decrease in temperature, assuming salinity remains constant. Since my system depends on measuring salinity in terms of conductivity, changes in conductivity caused by variations in temperature must be nullified. The system which I have devised accomplishes this necessary nullification of conductivity changes caused by temperature variations.

This alarm system has been so designed that the values at which it alarms can be pre-set manually to a calibrated dial and later changed, if necessary, without affecting the accuracy of the meter readings or alarm points.

I have devised an accurate alarm system which requires only simple reliable electrical circuits which do not involve expensive transformers or unreliable and complex electronic circuits which have high maintenance requirements that become valueless under relatively frequent tube failures. Such electronic circuits are also unsatisfactory because of instability from tube aging variations or different tube characteristics by replacement.

The alarm system of this invention is unusually precise because meter readings and alarm settings are unaffected by wide variations in voltage and frequency.

It has also been one of my objects to provide an alarm system of this character which is low cost in both materials required and labor to assemble, and servicing overhead will be low. I have accomplished such economies without sacrificing accuracy and reliability of the system.

My basic invention is adapted for incorporation in a multiple cell system using a single meter wherein means is provided for taking a reading of any selected cell while not upsetting the alarm circuit of all of the cells connected in the system.

With the foregoing general objects, features and results in view, as well as certain others which will be apparent from the following explanation, the invention consists in certain novel features in design, construction, mounting and combination of elements, as will be more fully and particularly referred to and specified hereinafter.

In the accompanying drawings:

FIG. 1 is a basic circuit diagram illustrating the electrical system of my invention used with one cell.

FIGS. 2a, 2b and 2c is a circuit diagram illustrating the use of my invention in a multiple cell circuit.

Figure 2B:
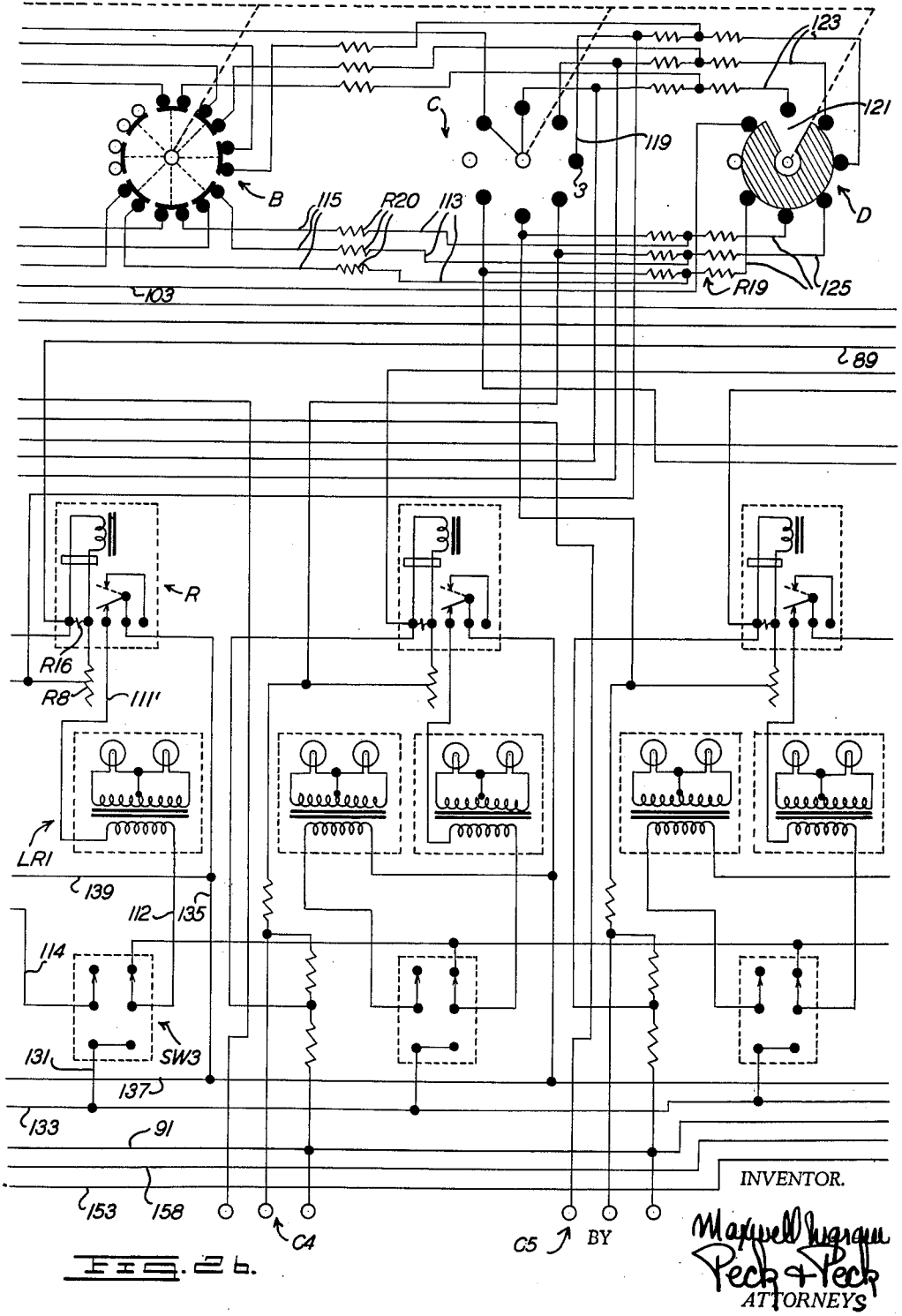

In the accompanying drawing FIG. 1 illustrating the basic electrical system which is used to achieve the aforementioned highly desirable results I have shown the circuit in unenergized position and have used the numerals 5 and 7 to designate leads which may be connected to a source of electric power which may be 115 volts A.C. 60 cycle, an automatic voltage regulator ballast tube VR may be series connected in lead 5. The tube VR is used to obtain alarm accuracy independent of voltage changes, however where input voltage is constant this tube may be eliminated. It is also within my contemplation to use a constant voltage transformer instead of the tube and the unregulated transformer. I provide an isolating transformer TR from the secondary of which a lead 9 extends which is connected at point C to a lead 11 one end of which is connected to one electrode 13 of a pair of electrodes the other electrode 15 being part of a conductivity cell which is immersed in spaced apart relation in the liquid, the salinity of which is being tested. The conductor 11 is extended to the other side of terminal C where it is connected at terminal X to lead 17 which is connected to thermistor R3. The conductivity cell includes, of course, the thermistor R3, so that it is in close thermal proximity to the water and the resistance thereof varies with changes in the temperature of the water.

Two resistors R6 and R7 in series are connected into the circuit in parallel with thermistor R3 by means of conductor 19 which is connected at terminal X to conductor 17 and by means of conductor 21 which is connected at V to a conductor 23 which in turn is connected to thermistor R3. A lead 25 extends from terminal Z between resistors R6 and R7 and connects them with relay R through conductors 29, 31 and rectifier 33, the relay R through rectifier 33 being connected to a wire wound linear potentiometer variable resistor R8 by conductor 35. The resistor R8 is connected to resistor R9 by means of conductor 37 and to terminal Y by means of conductor 39. I may place a resistor R10 in parallel with relay R to produce higher relay stability against vibration and current fluctuations, the resistor R10 being so included in the circuit by means of leads 41 and 43.

A lead 45 is connected to conductor 19 at 47 and to conductor 29 at 49, the lead 45 having a push button switch S therein. The purpose of this push button switch will be described hereinafter. The terminal points V and Y are connected by line 51 in which a resistor R4 is interposed.

The relay R includes an armature 53 which is biased by spring 55 to close the alarm circuit including the bell B1 or other signalling means which is connected in one lead 59 of the leads 57 and 59. The power source for the bell is impressed on leads 57 and 59.

The meter M is a power factor type meter and is employed as a current-ratio meter and does not measure either power-factor or phase relationships in the circuits. The meter circuit includes terminals A and B for a field coil 61, the terminals being connected to an independent secondary of transformer TR by leads 63 and 65, respectively. The meter includes a pair of internal air coils 67 and 67A which are locked mechanically to a pointer 69 and these are linked magnetically with field coil 61 to create a rotating field. It will be recognized that the direction of rotation is governed by the relative quantity of current in coils 67 and 67A. The input terminal 1 is connected to electrode 15 by conductor 71, a current limiting resistor R2 being interposed in the conductor. The input terminal 1 is connected between the two coils 67 by conductors 73 and 75. Input terminal 2 is connected to terminal Y of the thermistor circuit by conductor 77 and to and through the coil 67 and thence through coil 67A by conductors 79, 75, 73, coil 67A being connected by conductor 81 to a resistor R5 which in turn is connected to terminal 3 of the meter. The terminal 3 is connected to the transformer secondary by lead 83. In the event that more than one cell and only one meter is employed, a switching arrangement is used. The meter is then switched from cell position to cell position by repositioning its input terminals 1 and 2 to the cell circuit to be read. At the other positions which are not in the reading position, two resistors are substituted for the corresponding meter circuit impedances 1 to 3 and 2 to 3. Thus, the alarms are maintained in each cell at all times and are unaffected by the removal or inclusion of the meter.

I have experienced excellent and accurate results by providing the elements of my system with the following approximate values. Such values are introduced merely as one example and not as a limiting characteristic.

R2=400 ohms
R4=1000 ohms
R5=1625 ohms
R6=30000 ohms
R7=8500 ohms
R9=20000 ohms
R10=20000 ohms I have provided what I shall term a "thermistor circuit" XVY, an "alarm relay circuit" ZWY and a "cell circuit" CAQ.

When the alarm system is operating to energize a warning signal when the saline content of the water reaches a predetermined salinity setting the system functions in the following manner.

R6 and R7 are connected in parallel to the thermistor so that a partial voltage is drawn from the voltage drop across X—V, which is added to the voltage drop across R4 between points V—Y. Thus, the voltage impressed across the alarm relay circuit Z—Y is taken both from partially across the thermistor R3 and resistor R4. From calculations and tests it has been found that for best results R7 is approximately 22% of the sum of R6 plus R7 numerical ohms. This value produces a voltage between ZWY which does not change significantly when the temperature range of the water under test, thermally adjacent to the thermistor, varies from 40° F. to 250° F., at any salinity value. Thus, the voltage across the relay is virtually independent of temperature changes, and operates only from changes in salinity.

When the water temperature increases, the thermistor R3 which is in the cell and in close thermal proximity to the water, decreases in resistance and allows proportionately more current to flow in circuit XVY; however, R4 resistance value does not change. Thus, the voltage across thermistor or points XV decreases, and a corresponding voltage increase across R4 or VY; the resultant sum produces no voltage change across XVY, and subsequently no change across the alarm relay circuit, ZWY in which relay R exists. Using this balancing method of adding and subtracting voltages within the XWY circuit by voltage changes across resistor R3 (thermistor) and fixed resistor R4 brought about by temperature variations, it produces the same voltages across ZWY alarm relay circuit over the full temperature range, at any and all salinity values in the alarm range. This leaves only the currents from salinity changes to affect relay voltages and to make it alarm, at excess salinity.

A line voltage variation has an insignificant effect upon the accuracy of the alarm system, since a change in current brought about from voltage increase or decrease affects the thermistor circuit XVY in the same manner as it does the cell circuit CAQ. The relationship in both circuits under voltage changes remain the same and the voltage across this relay is unchanged. To offset very severe voltage changes a voltage regulator tube or other methods of voltage regulation may be employed.

The alarm is unaffected by frequency variations since the relay input has a selenium rectifier which does not change its output over a wide frequency range.

The relay is a sensitive type with a high internal input impedance and rectifier to operate a D.C. relay from an A.C. input. R8 potentiometer is varied to increase or decrease the relay current and voltage drop across relay R, for setting to a corresponding salinity value at which it must alarm. R9 is a ballast resistor to allow a minimum of potentiometer resistance, to produce widest arc calibrations and markings on a dial for setting the alarm. Impedance of the alarm circuit is sufficiently high so that any variations in it do not affect the thermistor circuit or reading accuracy. Resistor R10 is placed in parallel to relay R to produce higher stability against vibration and current fluctuations.

When measuring, at zero salinity reading the resistance across the electrodes is practically infinity, at maximum salinity dial reading the resistance is in the order of a few hundred ohms. This circuit is so arranged that on low salinity readings, where low salinity is desirable and required, the cell relay R is energized and holds the bell circuit open to prevent it from ringing. The relay armature is pulled and held in the normally open position to prevent current from going to the bell. When excessive salinity occurs at any temperature, the resistance across the electrodes is materially reduced, and since it is in parallel with the thermistor and resistor R4 (circuit XVY) and both circuits are connected within the meter, it results in AQ circuit shunting circuit XVY. Thus the cell circuit bypasses most of the current in circuit XVY; subsequently, reducing the current in XVY and further increasing the current flow in AQ. The reduced current in XVY causes a proportionate drop in voltage across ZWY to a low point where relay R armature spring tension overcomes the magnetic force and closes the relay contacts, and the alarm bell is energized to ring. The drop-out of the relay armature can be adjusted to any desired setting to correspond to a salinity reading by rotating the knob of the potentiometer R8 (variable resistor). For any desired alarm voltage across ZWY, a change in resistance of R8 causes a proportionate change in voltage drop across relay R, R8 and R9; therefore, an increase in resistance R8 reduces current and the voltage drop across relay R, and conversely. This small change in resistance in R8 within the high overall resistance of circuit ZWY has no effect on voltage or current in XVY and AQ subsequently does not introduce an error into the meter reading. Varying R8 from one end of its resistance range to the other does not perceptively move the pointer on the meter. A pointer on the shaft of R8 is superimposed onto a calibrated dial to permit accurate alarm settings. This dial can be rotated and locked around the potentiometer shaft to permit concentric displacement to compensate for different relay characteristics.

By having the relay energized when safe or low salinity is measured and de-energized on high salinity values, this situation produces a more dependable system which will alarm in the event of component or power failure; for example, a burnt-out relay or open transformer secondary winding, etc.

With regard to meter readings, R3 thermistor resistance varies inversely with temperature and allows more or less current to flow in the #2 terminal coil of the meter to balance a similar increased or decreased current in the #1 coil of the meter brought about by the inverse change in resistance of the water between the electrodes caused by temperature variations. This current balancing between circuits produces the same salinity readings, nullifying errors from temperature changes.

The purpose of push-button switch S is to momentarily energize the relay with a higher voltage by shorting out resistor R6 and inducing the same and full voltage of XVY across ZWY, of which the former is higher than the latter. This pulls in the armature to open the alarm bell circuit. If the salinity reading is lower than the alarm setting, the relay armature will remain pulled in after the push-button switch is released; if the salinity reading is higher, the relay armature will again drop out after the push-button switch is released, to restore ringing of the bell. This switch is necessary, as it is impractical to make a relay with a zero or negligible differential between pull-in and drop-out voltages. It also follows, when a higher than the alarmed salinity value is reduced to slightly below the alarm setting the relay armature may not pull in to stop the ringing. By the push button switch shorting out R6, a much higher voltage is placed across the relay temporarily to assist in pulling in the armature; thereafter, the normal relay voltage will hold it in. Without this switch, when reducing salinity, it would require a very low salinity reading to stop the alarm, which may take unnecessary time and effort to produce. It appears when going in the direction of reducing salinity, an apparent error exists between alarm setting and meter reading; this is not so, whereas in reality this difference is only in the differential of the relay armature action when reversing relay operation.

The resistors R2 and R4 have been selected to produce a dial reading of non-linear or logarithmic characteristics; i.e. an expanded scale on low salinity and a contracted scale on high values, since low readings are important in the operating range; whereas, all high values are undesirable and unusual but used for guidance and information only.

In FIG. 2 of the drawings I have illustrated the adaptation of the circuit of FIG. 1 into a multi-cell system involving switching arrangements and general circuit substitutions for meter and unique alarm circuit scheme. The circuit of FIG. 2 is merely illustrative as one example of an actual application of the circuit of FIG. 1 and variations thereof may be made without departing from the spirit of my invention or the scope thereof. While FIG. 2 illustrates the invention used in a six cell system it is to be understood that it is equally adaptable to systems involving a greater or lesser number of cells.

In the description of the circuit of FIG. 2 I shall use where possible, the same reference numerals as used in the description of FIG. 1 of the drawings to designate similar parts. The circuit of FIG. 2 is shown in unenergized position.

In FIG. 2 I have shown a system involving six conductivity cells, C1, C2, C3, C4, C5 and C6 which are shown more or less schematically with the exception of cell No. 3, C3, in which the electrodes 13 and 15, and the thermistor R3 are illustrated. In my detailed description I shall describe the circuit of cell C3 in detail, each cell circuit being similar.

I have used the numerals 5 and 7 to designate leads which may be connected to a source of electric power which may be 115 volts A.C. 60 cycle which lead to the primary of an isolating transformer TR. An automatic voltage regulator ballast tube VR may be series connected to lead 5.

Each of the conductivity cells is adapted to be immersed in the liquids being tested, one cell being at one testing station and another at a different testing station. Referring to cell C3 wherein I disclose the two electrodes 13 and 15 and the thermistor R3, it will be seen that the electrode 13 is connected into the circuit by conductor 11 which connects the electrode to two resistors R6 and R7 in series. The thermistor R3 being connected to conductor 11 at terminal 85 and in parallel with resistors R6 and R7 through conductors 19 and 19'. A further resistor R4 is connected at terminal 87 with conductor 19 and at its other side with wire wound potentiometer R8 which is connected to one side of the winding of a sensitive alarm relay R, the other side thereof being connected by conductor 89 with a push button switch SW5 having a contact for each cell circuit. The circuit through switch SW5 leads through lead 91 to the secondary of the isolating transformer TR, a lead 93 extends from the other side of said secondary to terminal 3 of the meter M which has been described above. A variable resistor R18 may be inserted across leads 91 and 93. Conductor 95 is connected to terminal 1 of the meter M and to resistor R2 which is connected by conductor 97 to a terminal of a push button switch SW2 for checking the panel to read a fixed value on a dial to ascertain that the panel is operating properly. The resistors R11 and R12 are dummy load resistors and govern the value read, the resistor R11 may be varied to suit the reading value required, this figure may be .261 EPM or 1.0 gr./gal. of salinity. One contact of switch SW2 is connected by conductor 127 with a terminal of section C of switch SW1 (to be described) and a lead 129 extends from conductor 127 to a terminal of switch SW2. The resistors R11 and R12 are connected to conductor 91 at terminal 99 by conductor 101. A further resistor R13 is connected to switch SW2 and to conductor 103 by conductor 102, the conductor 103 connecting meter terminal 3 with section D of a rotary switch SW1 having four sections, A, B, C and D. Switch SW2 is connected to section A by lead 105, while No. 3 contact of section A is connected to terminal 107 by conductor 109 and to electrode 15 by conductor 111 to complete the circuit.

I include in the circuit and controlled by the relay R an indicating lamp LR1 which may be a transformer type alarm. The lamp LR1 gives a visual signal when the saline content of the liquid at cell C3 has reached a predetermined value. One side of primary of LR1 is connected to relay R by conductor 111' while the other side thereof is connected by conductor 112 to a terminal of bell cut out switch SW3, and at its other end to alarm control relay R1 through conductor 141. A further terminal of switch SW3 is connected by conductor 114 to primary of bell cut out lamp LR2, the other side of said primary being connected by conductor 139 with conductor 135 which is connected to and extends between relay R and lead 137 which is connected at one end to power line.

The alarm control relay R1 is connected in series with the common lead 141 to the alarm lamps. In parallel with the coil of this relay is a fixed resistor R14 calculated to cause the voltage drop across it, from the current for one lamp to energize the relay to make the bell ring. Any additional lamps placed into action cause an increase in voltage which has no further effect since the relay is already energized. No feedback occurs because it does not involve the contact of this relay, only the coil which is common to all the lamps.

When switch SW3 is in bell in position (the relay R having been deenergized) the alarm control relay R1 is energized and the circuit is closed through conductor 141 to the alarm control relay R1 to energize the same and thence through conductors 143 and 145 to cause the operation of alarm bell B1 and through conductors 147, 149, 151 and 153 to lead 5.

When salinity is low, relay CR1 is in energized position and through conductor 155 energizes dumping relay DR to hold it in so that the solenoid valve V is energized and held in non-dumping position through conductor 156. The bell and LR1 lamp are deenergized when DR is energized through conductor 157. The common connection of DR is energized through conductor 158 that leads to the power source at conductor 7. When relay DR is deenergized the flasher F1 and LG1 lamp operate through conductors 159, SW4 and conductor 160.

In the event the salinity indicator becomes inoperative and to avoid dumping of water the switch SW4 is provided for manual operation. When SW4 is in manual position LR3 lamp lights to indicate this situation.

The described relay and alarm circuit allows the use of only one bell to create an audible alarm for any or all cell positions when excessive salinity is present, and it must operate for any one cell without feedback electrically to light other alarm cells which are not alarming.

SW1 is a selector switch which serves several functions; that is, selecting the cell position to be read, inserts the meter to the cell position selected for reading, substitutes for the meter impedances in those cell positions from which the meter has been removed to affect accurate alarming since removal of the meter changes the cell circuit values. The alarm relays are retained in active duty in all cell positions regardless of whether the meter is in or out of any particular cell position. Failure to substitute for the meter impedances in a circuit after the meter is removed will cause serious differences in alarm settings between supervisory position (when meter is not in) and meter reading positions. Resistor R19 is a wire wound adjustable resistor that is adjusted to substitute for the two coils within the meter and the internal limiting resistor of the meter. R20 substitutes for R19 in series with the meter to limit the current in the cell circuit.

Section A of switch SW1 is operable to select the cell electrode circuit desired and to impress the meter into that particular circuit for salinity readings. This has been described above in connection with cell C3, wherein the contacts of the section connect lead 105 of the meter circuit to lead 111 of the cell C3 circuit.

Section B of switch SW1 may comprise one or as many decks as there are cell positions to place resistors R19 and R20 into the circuits from which the meter is cut out to substitute for the meter impedances. The resistances R19 and R20 are connected in series by conductors 113 and to the proper contacts of section B by conductors 115.

Section C is used to carry the thermistor circuit to the meter of that cell position selected to be read. This connection is made in the example of cell C3 by conductors 19, 117 and 119 which is connected to contact 3 of the switch.

Section D of switch SW1 is used as a common connection to the substitute resistors R19 and R20 for those cell circuits which do not have the meter connected therein. This section is so constructed and arranged that the V section 121 interrupts the circuit to that cell position which has the meter connected therein, thus open circuiting the substitute resistors R19 and R20 when not required as failure to remove them would introduce an error. By the use of this substitute arrangement I am able to obtain very accurate alarm settings at all times and effect accurate alarm settings over the entire temperature range. Thus, leads 123 are connected to the contacts of the switch as are leads 125 which connect with substitute resistors R19, the circuit connected to contact No. 1, as shown in the drawing, does not include resistors 19 and 20.

Switch SW5 is used to overcome the relay differential and permits the resetting of the alarm.

Switch SW3 is used to cut out the audible alarm but not the visual alarm, in addition it lights up an additional alarm lamp to indicate that the audible alarm has been disconnected for that position only.

In order to simplify the drawing no alarm switch is shown in the C1 and C2 circuits.

I claim:

1. An electric system for causing the operation of an alarm when the saline content of a liquid reaches a predetermined value and for preventing operation of the alarm as a result of temperature changes in the liquid, including a pair of electrodes adapted to be immersed in the liquid under test, a thermistor in thermal proximity to the liquid under test, a relay adapted to be energized to open a circuit to the alarm and biased to close the circuit to the alarm and a source of current, and said system comprising a first circuit including said electrodes, a second circuit including said thermistor and said first circuit being electrically connected in parallel with said second circuit and a third circuit including said relay, said second circuit including a fixed resistor connected in series with said thermistor and said third circuit being connected across said thermistor and fixed resistor and including balancing means connected in parallel with said thermistor to provide voltage in said third circuit independent of temperature changes in said liquid under test and dependent upon the conductivity of the liquid under test, and said electrodes being connected in parallel with said thermistor and said fixed resistor of the second circuit whereby said first circuit shunts said second circuit when the resistance is materially reduced across said electrodes to thereby allow said relay to close the circuit to the alarm.

2. An electrical system including, in combination, a plurality of conductivity cells each adapted to be immersed at different locations in liquids being tested and each including a pair of electrodes and a variable resistor affected by temperature changes, a network circuit for each of said conductivity cells and each of said network circuits including an alarm and means for causing said alarm to operate when the saline content of the liquids reaches a predetermined value and for preventing operation of the alarm as a result of temperature changes in the liquids, and each of said network circuits including a fixed resistor connected in series with said variable resistor and said variable resistor being connected to one of said electrodes, a source of current connected to said electrodes, and each network circuit including a first circuit including said electrodes, and a second circuit including said variable resistor and said fixed resistor, said first circuit being electrically connected in parallel to said second circuit, and a third circuit connected across said second circuit and including said means, and said third circuit including proportionate balancing means connected in parallel with said variable resistor to provide voltage in said third circuit independent of temperature changes in the liquids under test and dependent upon the conductivity of the liquids under test, and a meter connected in said system, means for connecting said meter to a selected conductivity cell network circuit for taking a reading of the conductivity of the liquid at the selected conductivity cell and means for automatically disconnecting said meter from the other conductivity cell network circuits, and further means creating impedances in said other conductivity cell network circuits in substitution for the meter impedances removed therefrom to affect accurate alarming in said other conductivity cell network circuits.

3. An electrical system in accordance with claim 2, wherein said further means comprises series connected resistors.

4. An electrical system in accordance with claim 2, wherein said further means comprises series connected resistors and one of said resistors is a variable resistor.

5. An electrical system including, in combination, a plurality of conductivity cells each adapted to be immersed at different locations in liquids being tested and each including a pair of electrodes and a variable resistor affected by temperature changes, a network circuit for each of said conductivity cells and each network circuit which includes a cell circuit including said electrodes, a thermistor circuit including said variable resistor and including a fixed resistor series connected with said variable resistor, said cell circuit being electrically connected in parallel with said thermistor circuit, and an alarm relay circuit connected across said thermistor circuit, said circuits including means causing the operation of an alarm when the saline content of the liquids reaches a predetermined value and preventing operation of the alarm as a result of temperature changes in the liquid, series connected resistors connected in said alarm relay circuit for creating impedances therein, a meter connected in said system and to said cell and thermistor circuits, and a selector switch having a plurality of controlling sections connected into said system, one of said sections being operable to connect a selected cell circuit and the meter, another of said sections being operable to impress the said series connected resistors into all the cell circuits from which the meter has been disconnected, and another of said sections being operable to connect the thermistor circuit of the selected cell circuit to the meter, and another of said sections being operable to disconnect the cell circuit of the selected conductivity cell from said series connected resistors.

6. An electric system for causing the operation of an alarm when the saline content of a liquid reaches a predetermined value and for preventing operation of the alarm as a result of temperature changes in the liquid, said system comprising a cell circuit including a pair of electrodes arranged for the liquid to flow therebetween in contact with said electrodes, a thermistor circuit electrically connected in parallel with said cell circuit and including a thermistor in thermal proximity to the liquid under test and a fixed resistor connected in series therewith, and an alarm relay circuit electrically connected in parallel with said thermistor circuit and including a relay operable to open and close the circuit to the alarm, said alarm relay circuit including a pair of fixed resistors connected in series and in parallel with said thermistor and at a point in series with said thermistor and fixed resistor, and said relay being connected in said alarm relay circuit and to the fixed resistors at a point in series with respect thereto providing proportionate balancing means to provide voltage in said alarm relay circuit independent of temperature changes in the liquid under test and dependent upon the conductivity of said liquid, and a source of current connected to said cell circuit.

7. An electric system in accordance with claim 6, wherein said relay in said alarm relay circuit includes means biasing said relay to position causing actuation of an alarm while said relay is energized to prevent said biasing means to effect said relay, and said alarm relay circuit includes means connected across said pair of fixed resistors for shorting out one of said fixed resistors of the pair of fixed resistors to induce the full thermistor circuit voltage across said alarm relay circuit to energize the relay to prevent operation of said biasing means.

8. An electric system in accordance with claim 6, wherein said alarm relay circuit includes a further resistor connected in parallel to said relay to produce voltage stability in said circuit.

9. An electric system for causing the operation of an alarm when the saline content of a liquid reaches a predetermined value and for preventing operation of the alarm as a result of temperature changes in the liquid, said system comprising a first circuit including a pair of electrodes arranged for the liquid to flow therebetween in contact with said electrodes, a second circuit electrically connected in parallel with said first circuit and including a thermistor in thermal proximity to the liquid under test and a fixed resistor connected in series with said thermistor, a third circuit connected in parallel with said second circuit and including a relay adapted to be energized to open a circuit to the alarm and biased to close the circuit to the alarm, and means connected to said relay and biasing it to position closing the circuit to the alarm, a meter and a source of current connected thereto, and said first and second circuits being connected within the meter and said third circuit being connected across said thermistor and fixed resistor, said third circuit including balancing means connected in parallel with said thermistor to provide voltage in said third circuit independent of temperature changes in the liquid under test and dependent upon the conductivity of the liquid under test, and said electrodes connected in parallel with said thermistor to cause said first circuit to shunt said second circuit when the resistance across said electrodes is materially reduced to thereby cause said relay to close the circuit to actuate the alarm.

10. An electric system for causing the operation of an alarm when the saline content of a solution reaches a predetermined value and for preventing operation of the alarm as a result of temperature changes in the solution, said system comprising a first circuit including a pair of electrodes arranged for the solution to flow therebetween in contact with said electrodes, a second circuit including a variable resistor affected by temperature changes and positioned in thermal proximity to the solution under test and a fixed resistor connected in series with said variable resistor, and said first circuit being electrically connected in parallel with said second circuit, and a third circuit electrically connected in parallel with said second circuit and including means operable to open and close the circuit to the alarm, a source of current connected to said first and second circuits, and said third circuit including proportionate balancing means connected in parallel with said variable resistor in said second circuit to provide voltage in said third circuit independent of temperature changes in the solution under test and dependent upon the conductivity of the solution under test.

11. An electric system in accordance with claim 10, wherein said proportionate balancing means includes a pair of fixed resistors.

12. An electric system in accordance with claim 10, wherein said proportionate balancing means includes a pair of fixed resistors and said resistors are of different resistance values.

13. An electric system in accordance with claim 10, wherein said proportionate balancing means includes a pair of fixed resistors, one of said resistors having a value of approximately 22% of the sums of the two resistors in numerical ohms.

14. An electric system in accordance with claim 10, wherein said means is a relay and said balancing means includes a pair of fixed resistors connected together and said relay is connected to the resistors at a point in series.

References Cited in the file of this patent

UNITED STATES PATENTS

| | | |
|---|---|---|
| 2,370,609 | Wilson et al. | Feb. 27, 1945 |
| 2,505,936 | Behn | May 2, 1950 |
| 2,565,501 | Ingram | Aug. 28, 1951 |
| 2,807,006 | Collins et al. | Sept. 17, 1957 |